(12) United States Patent
Hattori et al.

(10) Patent No.: US 8,279,279 B2
(45) Date of Patent: Oct. 2, 2012

(54) IMAGE PROCESSING APPARATUS

(75) Inventors: Toshihiro Hattori, Okazaki (JP); Masayuki Imanishi, Okazaki (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 1072 days.

(21) Appl. No.: 12/230,212

(22) Filed: Aug. 26, 2008

(65) Prior Publication Data
US 2009/0059006 A1 Mar. 5, 2009

(30) Foreign Application Priority Data
Aug. 31, 2007 (JP) ................................. 2007-226342

(51) Int. Cl.
*H04N 7/18* (2006.01)
(52) U.S. Cl. ........ 348/148; 348/246; 348/344; 348/113; 340/461; 382/117
(58) Field of Classification Search .................. 348/113, 348/148, 244, 246; 340/461; 382/117
See application file for complete search history.

(56) References Cited

U.S. PATENT DOCUMENTS

| | | | |
|---|---|---|---|
| 5,815,199 A | 9/1998 | Palm et al. | |
| 6,037,975 A * | 3/2000 | Aoyama | 348/113 |
| 6,898,300 B1 * | 5/2005 | Iwaki | 382/117 |
| 7,143,856 B2 * | 12/2006 | Takahashi et al. | 180/274 |
| 7,231,069 B2 * | 6/2007 | Nahata | 382/117 |
| 7,256,688 B2 * | 8/2007 | Mizusawa | 340/461 |
| 7,619,668 B2 * | 11/2009 | Saka et al. | 348/251 |
| 2001/0028730 A1 * | 10/2001 | Nahata | 382/117 |
| 2004/0189448 A1 * | 9/2004 | Eggers et al. | 340/425.5 |
| 2004/0260469 A1 * | 12/2004 | Mizusawa | 701/300 |
| 2006/0164347 A1 * | 7/2006 | Umezaki | 345/76 |
| 2006/0274170 A1 * | 12/2006 | Azuma | 348/246 |
| 2007/0146503 A1 * | 6/2007 | Shiraki | 348/231.3 |
| 2007/0188650 A1 * | 8/2007 | Kobayashi et al. | 348/344 |
| 2008/0007428 A1 * | 1/2008 | Watanabe et al. | 340/901 |
| 2008/0112187 A1 * | 5/2008 | Katsumata et al. | 362/611 |

(Continued)

FOREIGN PATENT DOCUMENTS
JP    A-4-274941    9/1992
(Continued)

OTHER PUBLICATIONS

Office Action issued from the German Patent Office on Jul. 20, 2009 in the corresponding German patent application No. 10 2008 038 463.1-31 (and English translation).

(Continued)

*Primary Examiner* — Wing Chan
*Assistant Examiner* — Razu Miah
(74) *Attorney, Agent, or Firm* — Posz Law Group, PLC

(57) ABSTRACT

An image processing apparatus permits a user to readily recognize a current state of an angle of view. When an angle of view is switched from a wide-angle to a narrow-angle, range display is performed for a predetermined time prior to the switching. Range display includes a narrow-angle image frame formed with lines indicating a border of an image displayed for a predetermined time prior to the switching. After the predetermined time, a narrow-angle image is displayed and the range display is no longer displayed. The range display allows a user to readily recognize that the wide-angle image has been switched to the narrow-angle image by recognizing to what area in a pre-switching wide angle of view image the post-switching narrow-angle image corresponds.

16 Claims, 12 Drawing Sheets

U.S. PATENT DOCUMENTS

| | | |
|---|---|---|
| 2008/0129845 A1 | 6/2008 | Azuma |
| 2008/0129846 A1 | 6/2008 | Azuma |
| 2008/0136943 A1 | 6/2008 | Azuma |
| 2008/0186384 A1* | 8/2008 | Ishii et al. ............... 348/187 |
| 2009/0030611 A1* | 1/2009 | Chen ............... 701/213 |
| 2009/0143967 A1* | 6/2009 | Lee et al. ............... 701/119 |

FOREIGN PATENT DOCUMENTS

| | | |
|---|---|---|
| JP | A-6-32175 | 2/1994 |
| JP | A-7-192200 | 7/1995 |
| JP | A-09-142206 | 6/1997 |
| JP | A-2003-212041 | 7/2003 |
| JP | A-2004-252370 | 9/2004 |
| JP | A-2004-260449 | 9/2004 |
| JP | A-2005-33594 | 2/2005 |
| JP | A-2005-112267 | 4/2005 |
| JP | A-2006-304376 | 11/2006 |
| JP | A-2007-81925 | 3/2007 |
| JP | A-2007-81932 | 3/2007 |
| JP | A-2007-104198 | 4/2007 |

OTHER PUBLICATIONS

Office Action issued from the Japanese Patent Office on Jan. 26, 2010 in the corresponding Japanese patent application No. 2007-226342 (and English translation).

Apline Mobile Media Solutions, http://www.alpine.co.jp/products/mobilemediastation/x07/2006/safety_eco.html, "TOPVIEW® Camera" (Jan. 10, 2007) (partial translation enclosed).

* cited by examiner

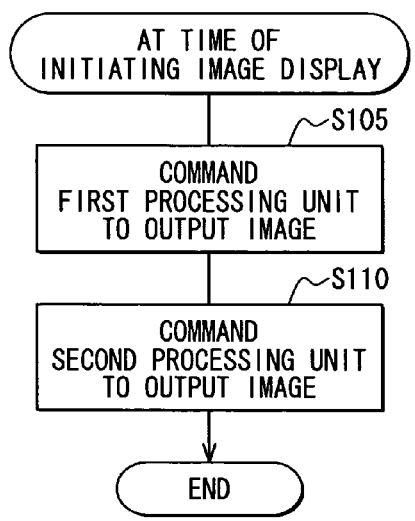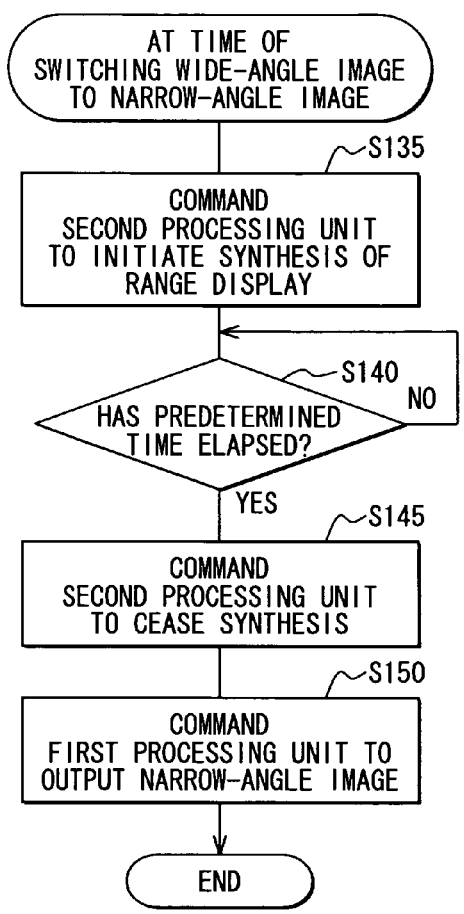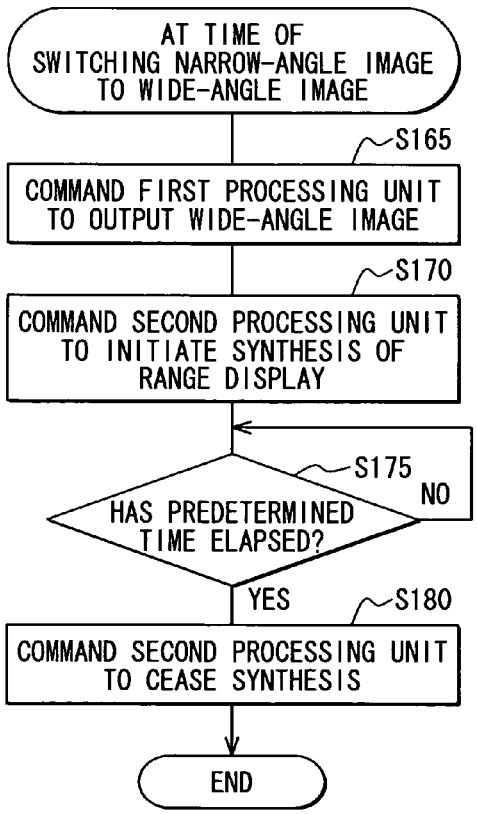

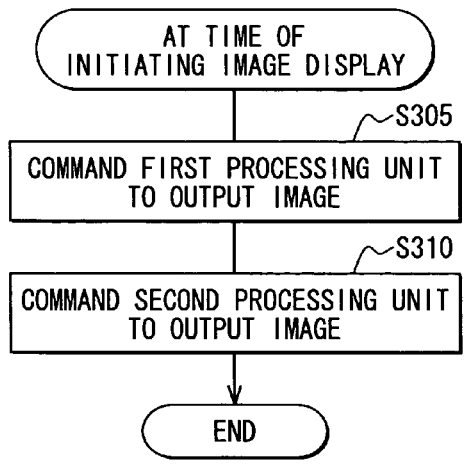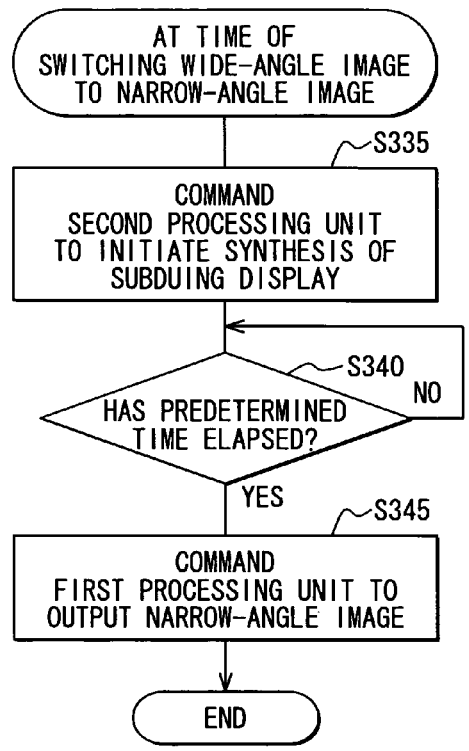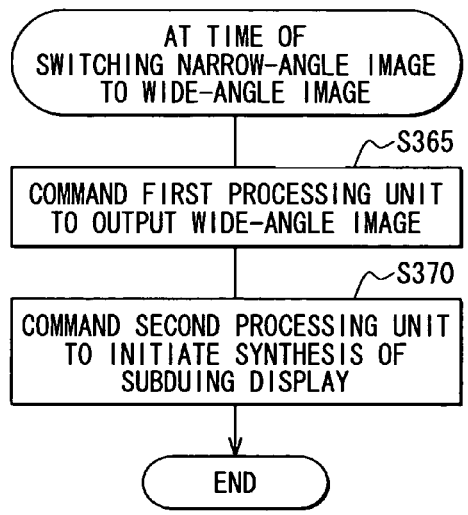

IMAGE PROCESSING APPARATUS

CROSS-REFERENCE TO RELATED APPLICATIONS

The present application is based on and claims priority to JP 2007-226342 filed Aug. 31, 2007, the entire contents of which are incorporated herein by reference.

BACKGROUND OF THE INVENTION

1. Field of the Invention

The present invention is related to processing an image captured by a camera mounted in a vehicle, and more specifically to switching between and outputting multiple images of different angles of view.

2. Description of the Related Art

It is known to use an image processing apparatus to switch images of different angles of view so as to display the images on a display device by employing a camera having a zooming facility or by digitally processing a captured image. However, when such images are switched and displayed, it can be difficult for a user to recognize at what angle of view an image displayed on the display device has been captured.

A technology is proposed for solving the above problem, for example, in JP-A-2005-33594, where, as described in paragraph [0097] thereof, an image on a wide-angle side is intermittently displayed when a narrow-angle side image should be displayed. The intermittent display of the wide and narrow angle images helps a user recognize that the image on the narrow-angle side is displayed.

However, disadvantages exist in the technology described in JP-A-2005-33594 in that, when images are switched, the ability of a user to recognize the switching of images can be somewhat impaired causing the user to be unable to catch up. For example, when a user blinks during switching or is distracted during the switching, the user may be unaware that the switching occurred. Further, it can be difficult to intuitively discern whether an image is switched to an image on a narrow-angle side or an image on a wide-angle side. Since the image on the wide-angle side is intermittently displayed when the image on the narrow-angle side should be displayed, a user cannot intuitively learn which of the images on the wide-angle and narrow-angle sides is displayed until the user comprehensively recognizes the respective size of an entity appearing in the image on the narrow-angle side and an entity appearing in the image on the wide-angle side, and the positional relationship between the entities.

SUMMARY OF THE INVENTION

The present invention addresses the foregoing and other disadvantages, and provides an image processing apparatus that can switch and output multiple images of different angles of view, and permit a user to readily recognize a current state of an angle of view.

An image processing apparatus in accordance with a first aspect includes a range display processing means that performs range display to discriminate, for a predetermined time, a narrow-angle image range in the wide-angle image outputted by an image output means, before an image to be inputted by an image input means is switched from a wide-angle image to a narrow-angle image by an angle-of-view switching means. A predetermined time can refer to a time that is long enough for a user to discern the range display and fully recognize the fact that an image is switched to an image of a different angle of view. For example, a time of about three or five seconds would be appropriate for the predetermined time. The user can arbitrarily designate the length of the predetermined time using an operating unit or the like.

Because of range display performed on an image, a user can readily recognize that a wide-angle image is switched to a narrow-angle image. Moreover, because of the range display, the user can readily recognize to what place in the pre-switching image, that is, the wide-angle image the post-switching image, that is, the narrow-angle image corresponds.

An image processing apparatus in accordance with another aspect includes a range display processing means that performs range display when an image to be inputted by an image input means is switched from a narrow-angle image to a wide-angle image. The range display is intended to discriminate, for a predetermined time, a narrow-angle image range in a wide-angle image outputted by an image output means. Because range display performed on an image, a user can readily recognize that a narrow-angle image has been switched to a wide-angle image. Moreover, because of the range display, the user can readily recognize to what place in the post-switching image, that is, the wide-angle image the pre-switching image, that is, the narrow-angle image corresponds.

An image processing apparatus in accordance with another aspect includes a range display processing means that performs range display before an image to be inputted by an image input means is switched from a wide-angle image to a narrow-angle image by an angle-of-view switching means. The range display is intended to discriminate, for a predetermined time, a narrow-angle image range in a wide-angle image outputted by an image output means. When the image to be inputted by the image input means is switched from the narrow-angle image to the wide-angle image by the angle-of-view switching means, the range display is not performed on the wide-angle image outputted by the image output means. Because range display performed on an image, a user can readily recognize that a wide-angle image is switched to a narrow-angle image. Moreover, because of the range display, the user can readily recognize to what place in the pre-switching image, that is, the wide-angle image the post-switching image, that is, the narrow-angle image corresponds. On the other hand, when the narrow-angle image is switched to the wide-angle image, since the image processing apparatus does not perform the range display, a processing load incurred by the image processing apparatus is limited.

The range display to be performed by the range display processing means appears, as in accordance with another aspect, as lines along the contour of a narrow-angle image. According to such a range display, a user can more readily recognize that a narrow-angle image has been switched to a wide-angle image. Moreover, the user can more readily recognize to what place in the post-switching image, that is, the wide-angle image the pre-switching image, that is, the narrow-angle image corresponds.

An image processing apparatus in accordance with another aspect includes an intermediate angle-of-view image production means that before an image to be inputted by an image input means is switched to an image of a different angle of view by an angle-of-view switching means, produces an image covering at least one of intermediate angles of view that fall within the range from a pre-switching angle of view to a post-switching angle of view, and allows an image output means to output the produced images of the intermediate angles of view in sequence by the angle of view within the range from the pre-switching angle of view to the post-switching angle of view. When it says that the image output means is allowed to output the produced images in sequence by the angle of view in the range from the pre-switching angle of view to the post-switching angle of view, it means that assuming that, for example, the pre-switching angle is 130°, the post-switching angle of view is 180°, and images of angles of view of 140°, 150°, 160°, and 170° are produced as images of intermediate angles of view, the intermediate angle-of-view images are switched and outputted in the sequence from 140° through 150° and 160° to 170°.

According to the above described image processing apparatus, a user can readily recognize that an image has been switched to an image of a different angle of view. Moreover, the user can readily recognize to what place in the post-switching image the pre-switching image corresponds.

An image processing apparatus in accordance with another aspect includes a display subduing processing means that performs display subduing when an image to be inputted by an image input means is switched to an image of a different angle of view by an angle-of-view switching means. The display subduing is intended to subdue, for a predetermined time, a user-recognizable change in an angle of view, on an image outputted by an image output means. A user can accordingly readily recognize that an image has been switched to an image of a different angle.

The display subduing to be performed when a narrow-angle image is switched to a wide-angle image, as in accordance with another aspect, is such that masking processing—the processing of masking an image area contained in the wide-angle image but not contained in the narrow-angle image—is executed simultaneously with the switching of the images. Unmasking processing—the processing of restoring a state attained prior to the masking processing—is then executed for a predetermined time. Masking refers to the processing resulting in a masked part of an image. Masking has the advantage that a masked part of an image is harder to discern than a part thereof that is not masked.

According to the above display subduing, a user can more readily recognize that a narrow-angle image has been switched to a wide-angle image, and readily recognize to what place in the post-switching image, that is, the wide-angle image the pre-switching image, that is, the narrow-angle image corresponds.

Moreover, the unmasking processing is, as in accordance with another aspect, intended to gradually diminish an area that has undergone masking processing. As for a way of diminishing the area that has undergone masking processing, for example, a method of gradually diminishing the area from the upper side of an image displayed on the display device, to the lower side thereof, or a method of diminishing the area radially from the center of an image to the perimeter thereof is conceivable. According to the unmasking processing, the aforesaid advantage of the present invention will be emphasized.

An area having undergone masking processing is, as in accordance with another aspect, gradually diminished from the center of an image that has been outputted by the image output means and displayed on the display device, to the right and left lateral sides thereof. Consequently, when a narrow-angle image is switched to a wide-angle image, a user is likely to have a sense of spread and can recognize that switching has occurred.

Display subduing to be performed when a wide-angle image is switched to a narrow-angle image, as in accordance with another aspect, is such that before the images are switched, masking processing—the processing of applying a predetermined mask to an image area contained in the wide-angle image alone but not contained in the narrow-angle image—is performed for a predetermined time. Unmasking processing—processing to restore a state attained prior to the masking processing—is then executed simultaneously with the switching of the angles of view.

According to the display subduing, a user can more readily recognize that a wide-angle image has been switched to a narrow-angle image and can readily recognize to what place in the post-switching image, that is, the narrow-angle image the pre-switching image, that is, the wide-angle image corresponds.

Moreover, masking processing is, as in accordance with another aspect 11, to gradually expand an area that undergoes masking processing. As for a way of expanding the area that undergoes masking processing, for example, a method of gradually expanding the area from the lower side of an image, which has been displayed on the display device, to the upper side thereof, or a method of expanding the area from the perimeter of the image to the center thereof is conceivable. According to the masking processing, the aforesaid advantage of the present invention will be more markedly exerted.

An area that undergoes masking processing is, as in accordance with another aspect, gradually expanded from both the right and left edges of an image outputted by the image output means and displayed on the display device, to the center thereof. Consequently, when a wide-angle image is switched to a narrow-angle image, a user is likely to have a sense of narrowness and can more sensuously recognize the fact of the switching.

It should be noted that the image input means inputs, as in accordance with another aspect, an image captured by a camera that represents a range behind a vehicle that is typically difficult for a user to discern and therefore is often viewed. The image representing the range behind the vehicle is processed by the image processing apparatus. The aforesaid advantage of the image processing apparatus is successfully exerted.

Moreover, the image processing apparatus further includes a shift position detection means for inputting a shift position signal of a vehicle. When a signal inputted by a shift position signal input means is a signal signifying a backing shift position, the image output means outputs an image, such as an image representing a range behind the vehicle, as in accordance with another aspect. In such a case, an image is displayed on the display device when the necessity of the image is high. Consequently, the image processing apparatus will prove user-friendly.

BRIEF DESCRIPTION OF THE DRAWINGS

Other objects, features and characteristics of the present invention will be appreciated and become apparent to those of ordinary skill in the art and all of which form a part of the present application. In the drawings:

FIG. 2A to FIG. 2C are flowcharts illustrating exemplary operations performed in accordance with a first embodiment;

FIG. 8A to FIG. 8C are flowcharts illustrating exemplary operations to be performed by the image processing apparatus of a third embodiment;

DETAILED DESCRIPTION OF THE EXEMPLARY EMBODIMENTS

Embodiments of the invention will be described in further detail with reference to the accompanying drawings. It is to be distinctly understood that the invention is not limited thereto but may be otherwise variously embodied.

First Embodiment

Figure 1A:
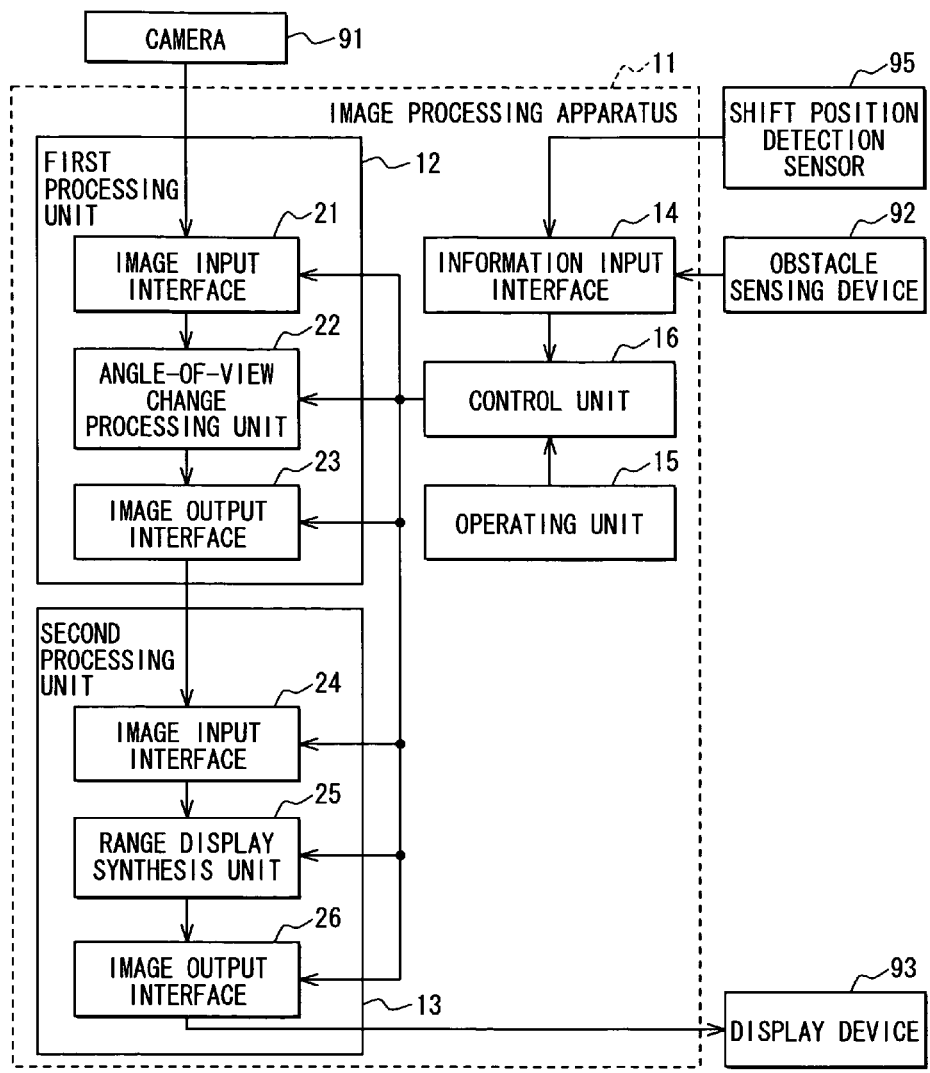
FIG. 1A is a block diagram illustrating a configuration of an exemplary image processing apparatus of a first embodiment.

FIG. 1A is a block diagram for explaining, in connection with a first embodiment, an image processing apparatus 11 and various devices connected thereto such as a camera 91, an obstacle sensing device 92, a display device 93, and a shift position detection sensor 95. The image processing apparatus 11 is a processing apparatus inputting an image of one kind of angle of view or a raw image from the camera 91, switching the raw image and an image of a narrow angle of view produced from the raw image, and displaying the images on the display device 93. The image processing apparatus 11 includes a first image processing section 12, a second image processing section 13, an information input interface 14, an operating unit 15, and a control unit 16.

The first image processing section 12 can modify the angle of view of an inputted image, can zoom in or out the inputted image, and includes an image input interface 21, an angle-of-view change processing block 22, and an image output interface 23. The image input interface 21 includes an interface through which a video signal is inputted from the camera 91. The angle-of-view change processing block 22 can change a video signal passed from the image input interface 21, into an image of a narrow angle of view of 130° narrower than the angle of view of a raw image, in response to a command sent from the control unit 16. Changing an angle of view is achieved by a known digital image processing technology such as a technology for cutting out an image or providing a digital zooming operation associated with the image, and intended to produce a narrow-angle image. The angle-of-view change processing block 22 may output a video signal of an image whose angle of view is not modified, that is, a video signal of the raw image that is a wide-angle image without any change.

The image output interface 23 is an interface for outputting a video signal of an image produced by the angle-of-view change processing block 22, to the second image processing section 13. The second image processing section 13 can overlay a range display on an image or region thereof inputted from the first image processing section 12, and includes an image input interface 24, a range display synthesis block 25, and an image output interface 26. The image input interface 24 is an interface through which a video signal is inputted from the first image processing section 12. The range display synthesis block 25 overlays a range display on an image produced based on a video signal passed from the image input interface 24 in response to an instruction sent from the control unit 16. A range display can refer to a display that indicates a range covered by a narrow-angle image and contained in a wide-angle image or a raw image. The range display can appear as, for example, lines indicating the border of the narrow-angle image. A concrete example will be described in greater detail hereinafter. If a range display overlay instruction is not issued from the control unit 16, the range display synthesis block 25 may output the video signal passed from the image input interface 24 to the image output interface 26 without any change. It will be appreciated that the image output interface 26 is an interface for outputting a video signal of an image produced by the range display synthesis block 25, to the display device 93.

The information input interface 14 is an interface through which various signals are inputted from the obstacle sensing device 92 and a shift position signal is inputted from the shift position detection sensor 95.

The operating unit 15 includes a touch panel layered on or integrated into the display surface of the display device 93, mechanical switches arranged around the display device 93, and a steering switch disposed on a steering wheel. The operating unit 15 permits a user to input an operating command to the image processing apparatus 11.

The control unit 16 can execute various processing by controlling, for example, the above described components according to programs stored in a ROM or a flash memory. The control unit 16 can include a known microcomputer.

Figure 1B:
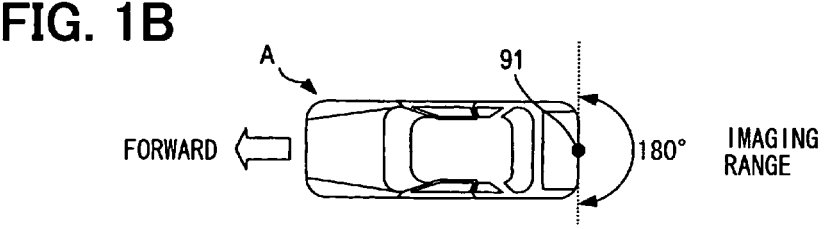
FIG. 1B is a diagram illustrating the mounted position of an exemplary camera.

The camera 91 can include an onboard camera mounted in the rear part of a vehicle and configured to capture an image representing a range around the vehicle at an angle of view of as wide as 180°. An image captured by the camera 91 is transmitted as a video signal to the image processing apparatus 11 according to a wired method but can be transmitted wirelessly according to a known method. As shown in FIG. 1B, the mounted position of the camera 91 is disposed in the center of the rear end of a vehicle A and can image a range of 180° behind the vehicle.

It will be appreciated that the obstacle sensing device 92 can sense an obstacle existing around a vehicle, by means of a sonar, a radar, or the like, and calculates a distance to the sensed obstacle. The obstacle sensing device 92 is configured to transmit the result of sensing of an obstacle and information on a distance to a sensed obstacle, wirelessly or through a wired connection, as obstacle information to the image processing apparatus 11.

The display device 93 includes a color image display unit (not shown) such as a liquid crystal panel, and displays an image according to a video signal inputted from the image processing apparatus 11. It should be noted that the above described touch panel (not shown) associated with the operating unit 15 can be layered on or integrated into the display surface of the color image display unit.

The shift position detection sensor 95 is attached to a vehicle transmission (not shown) and detects a shift position of the transmission. Based on a signal sent from the shift position detection sensor 95 it can be learned whether a current shift position is a drive (D) position, a neutral (N) position, or a reverse (R) position.

An operation to be performed by the image processing apparatus 11 at the time of initiating display of an image will now be described in connection with the flowchart of FIG. 2A. In a state of vehicle backing or a state in which the control unit 16 receives a signal from the shift position detection sensor 95 through the information input interface 14 signifying that the current shift position is the R position, the control unit 16 issues commands to the components of the first image processing section 12 at S105 associated with display if the control unit 16 receives an image display instruction from a user via the operating unit 15. Specifically, a command signifying that acquisition of a video signal from the camera 91 should be initiated is issued to the image input interface 21; a command signifying that output of a raw image or a wide-angle image should be initiated without any change in an angle of view is issued to the angle-of-view change processing block 22; and a command signifying that output of a video signal to the second image processing section 13 should be initiated is issued to the image output interface 23.

Thereafter, the control unit 16 issues commands to the components of the second image processing section 13 at S110. Specifically, a command signifying that acquisition of a video signal from the first image processing section 12 should be initiated is issued to the image input interface 24; a signal signifying that output of an input image should be initiated without synthesis of range display is issued to the range display synthesis block 25; and a command signifying that output of the video signal to the display device 93 should be initiated is issued to the image output interface 26.

Figure 3A:
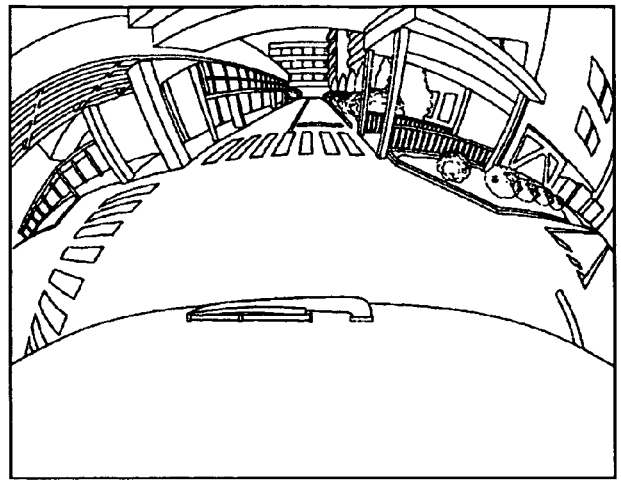
FIG. 3A to FIG. 3C are diagrams illustrating examples of images to be displayed by the image processing apparatus in accordance with a first embodiment.

As a result, an image acquired from the camera 91 is displayed on the display device 93 as it was captured, without undergoing image processing as described herein. Namely, a wide-angle image is displayed on the display device 93. FIG. 3A shows a concrete example of the wide-angle image. The image shown in FIG. 3A is an image whose angle of view is as wide as 180°.

Next, an operation to be performed by the image processing apparatus 11 at the time of switching an image displayed on the display device 92, from a wide-angle image whose angle of view is, for example, 180° to a narrow-angle image whose angle of view is, for example, 130° will be described in connection with the flowchart of FIG. 2B.

In the state of backing the vehicle, if the control unit 16 receives a signal from the obstacle sensing device 92 through the information input interface 14 signifying that a distance to an obstacle falls below 5 m, the control unit 16 issues a command to the range display synthesis block 25 of the second image processing section 13 signifying that range display should be synthesized at S135. A concrete example of range display will be described in connection with FIG. 3B.

Figure 3B:
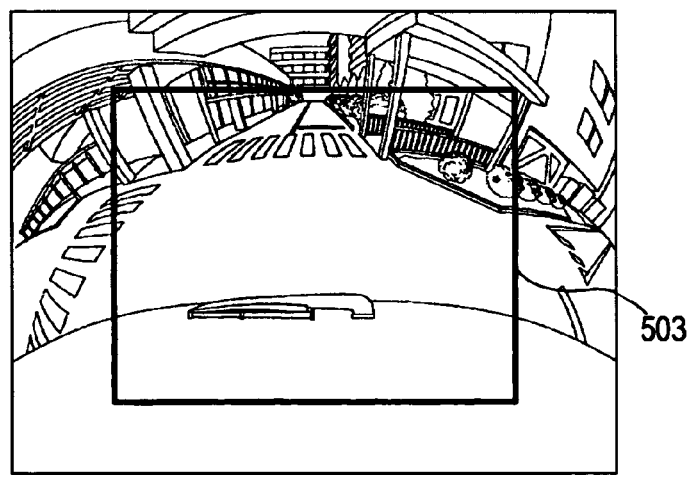

An image shown in FIG. 3B has a narrow-angle image frame 503 synthesized or otherwise overlaid on the image shown in FIG. 3B. The narrow-angle image frame 503 includes lines indicating the border of a narrow-angle image to which the image will be switched later. Because of the image, a user can recognize an area of the narrow-angle image to which the image will be switched later.

Referring back to FIG. 2B, a description will proceed. The control unit 16 stands by for a predetermined time at S140. If a decision is made that the predetermined time has elapsed, the control unit 16 issues a command to the range display synthesis block 25 of the second image processing section 13 signifying that synthesis of range display should be ceased at S145. It should be noted that even when synthesis is ceased, the range display synthesis block 25 outputs a video signal passed from the image input interface 24 to the image output interface 26 without change.

Figure 3C:
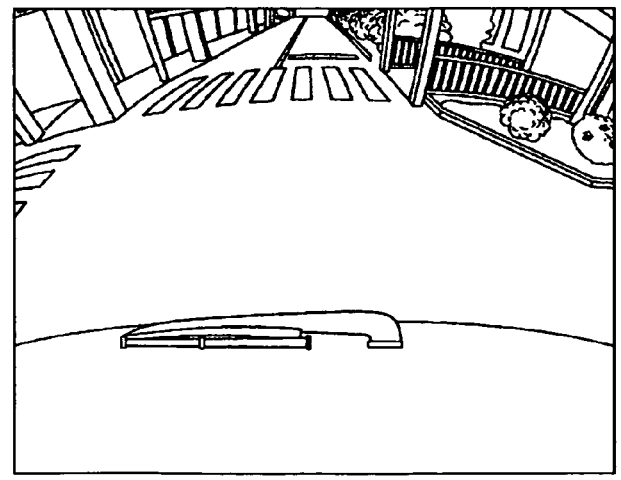

The control unit 16 issues a command signifying that an output image should be changed to a narrow-angle image, to the angle-of-view change processing block 22 of the first image processing section 12 at S150. The angle-of-view change processing block 22 having received the command begins performing digital image processing on an input image or a raw image. The digital processing is such that an area which covers an angle of view of 130° is cut out of an input image or a raw image, and then digitally zoomed in. As a result, an image shown in FIG. 3C is displayed on the display device 93. The image shown in FIG. 3C is an image whose angle of view is, for example, 130°.

When a state of a wide-angle image display is switched to a narrow-angle image display state, a range display is synthesized prior to the switching as shown, for example, in FIG. 3B. When a predetermined time elapses, the range display is deleted from the image and the image is switched to the narrow-angle image as shown, for example, in FIG. 3C. Consequently, a user can readily recognize that the range display is achieved and the wide-angle image is switched to the narrow-angle image. Moreover, because of the range display, the user can readily recognize where in the pre-switching image, that is, the wide-angle image, the narrow-angle or post-switching image corresponds.

Next, at the time of switching an image displayed on the display device 93 from a narrow-angle image having an angle of view of 130° to a wide-angle image having an angle of view of 180°, the operation of image processing apparatus 11 will be described in connection with the flowchart of FIG. 2C.

In the state of backing the vehicle, if the control unit 16 receives a signal from the obstacle sensing device 92 through the information input interface 14 signifying that a distance to an obstacle is greater than or equal to 5 m or that no obstacle is sensed, the control unit 16 issues a command to the angle-of-view change processing block 22 of the first image processing section 12 signifying that an output image should be changed to a wide-angle image or a raw image at S165. The angle-of-view change processing block 22 having received the command ceases the digital image processing on the input image or raw image, and outputs the input image or raw image without change.

The control unit 16 then issues a command to the range display synthesis block 25 of the second image processing section 13 signifying that range display should be synthesized, at S170. An image to be displayed as the result of the command is identical to that described previously and shown in FIG. 3B.

The control unit 16 stands by for a predetermined time at S175. If a decision is made that the predetermined time has elapsed, the control unit 16 issues a command to the range display synthesis block 25 of the second image processing section 13 signifying that synthesis of range display should be ceased at S180. Even if the synthesis is ceased, the range display synthesis block 25 outputs a video signal passed from the image input interface 24, to the image output interface 26 without any change. As a result, the wide-angle image or raw image from which the range display is deleted is displayed on the display device 93 as shown, for example, in FIG. 3A.

As mentioned above, when a narrow-angle image display state is switched to a wide-angle image display state, after the switching is completed, range display is achieved only for a predetermined time as shown, for example, in FIG. 3B. When the predetermined time elapses, the range display is deleted from the image and the wide-angle image alone is displayed as shown, for example, in FIG. 3A. Consequently, a user can readily recognize that the range display has been achieved and the narrow-angle image has been switched to the wide-angle image. Moreover, because of the range display, the user can recognize to what place in the post-switching image, that is, the wide-angle image the pre-switching image, that is, the narrow-angle image corresponds.

Exemplary correspondences between the terms employed in the above description of a first embodiment and the terms set forth in claims is as follows. The image input interface 24 can act as the image input means, the control unit 16 can act as the angle-of-view switching means, the image output interface 26 can act as the image output means, the range display synthesis block 25 can act as the range display processing means, and the information input interface 14 can act as the shift position signal input means.

Second Embodiment

Figure 4:
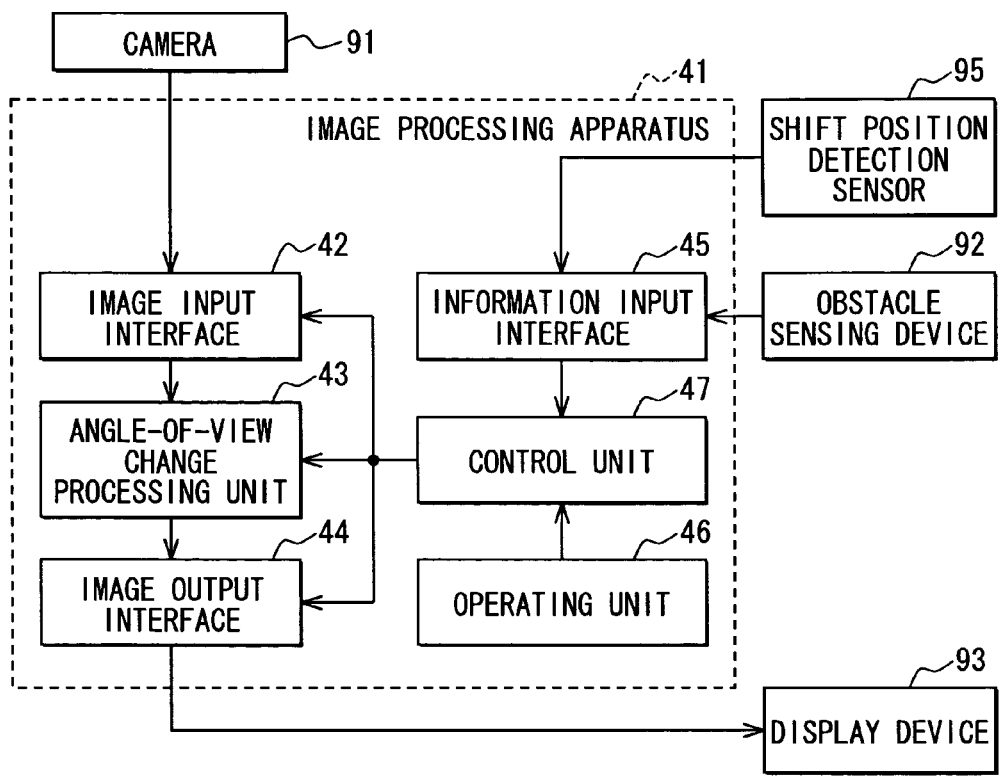
FIG. 4 is a block diagram illustrating a configuration of an exemplary image processing apparatus of a second embodiment.

FIG. 4 is a block diagram explaining an image processing apparatus 41 according to a second embodiment and various devices connected thereto such as a camera 91, an obstacle sensing device 92, and a display device 93. Since the camera 91, obstacle sensing device 92, and display device 93 are identical to those described above in connection with a first embodiment, a description will be omitted.

The image processing apparatus 41 is a processing apparatus inputting an image of one kind of angle of view, that is, a raw image from the camera 91, switching the raw image and an image of a narrow angle of view produced from the raw image, and displaying the images on the display device 93. The image processing apparatus 41 includes an image input interface 42, an angle-of-view change processing unit 43, an image output interface 44, an information input interface 45, an operating unit 46, and a control unit 47.

The image input interface 42 is an interface through which a video signal is inputted from the camera 91.

The angle-of-view change processing unit 43 changes a video signal passed from the image input interface 42, into an image of an angle of view designated by the control unit 47, that is, an angle of view narrower than the angle of view of the raw image. Changing an angle of view is achieved by a known digital image processing technology such as a technology for cutting out an image or providing a digital zooming operation associated with the image, whereby a narrow-angle image is produced. It should be noted that the angle-of-view change processing unit 43 may output the video signal of an image of which angle of view is not changed, that is, the raw image that is a wide-angle image without any change.

The image output interface 44 is an interface through which a video signal of an image produced by the angle-of-view change processing unit 43 is outputted to the display device 93.

The information input interface 45 is an interface through which various signals are inputted from the obstacle sensing device 92.

The operating unit 46 includes a touch panel layered on or integrated into the display surface of the display device 93, mechanical switches arranged around the display device 93, and a steering switch disposed on a steering wheel, and that permits a user to input an operating command to the image processing apparatus 41.

The control unit 47 is formed with a known microcomputer and executes various processing by controlling the aforesaid components according to programs stored in a ROM or a flash memory.

Figure 5A:
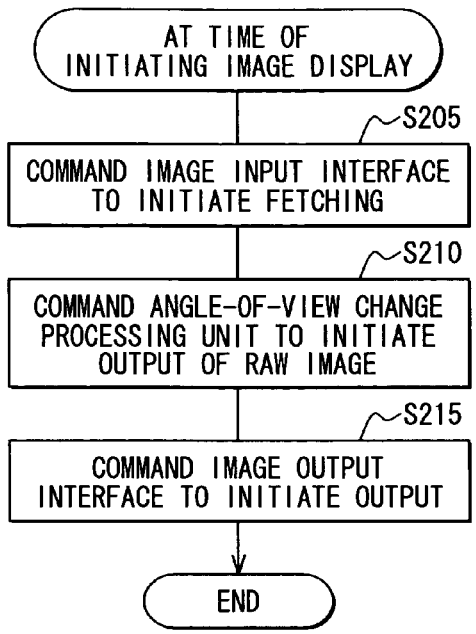
FIG. 5A to FIG. 5C are flowcharts illustrating exemplary operations in accordance with a second embodiment.

An operation to be performed by the image processing apparatus 41 at the time of initialing display of an image will be described in connection with the flowchart of FIG. 5A. In a state of backing the vehicle or in a state in which the control unit 47 has received a signal from the shift position detection sensor 95 through the information input interface 45 signifying that the current shift position is the R position, if the control unit 47 receives an image display instruction from a user via the operating unit 46, the control unit 47 issues a command to the image input interface 42 signifying that acquisition of a video signal from the camera 91 should be initiated at S205. The control unit 47 issues a command to the angle-of-view change processing unit 43 signifying that output of a raw image or a wide-angle image should be initiated without any change in an angle of view at S210. The control unit 47 issues a command to the image output interface 44 signifying that output of the video signal to the display device 93 should be initiated at S215.

Figure 6A:
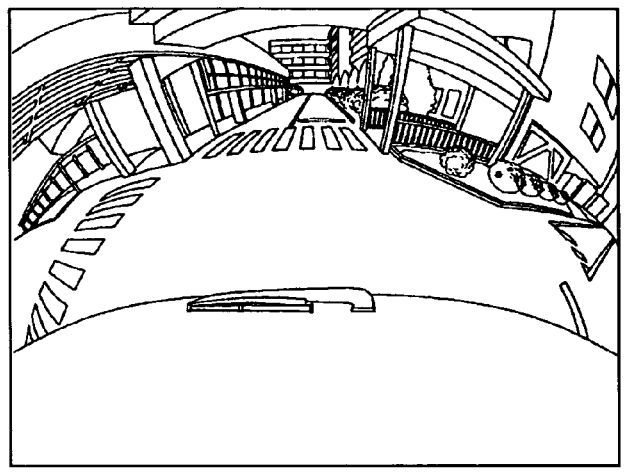
FIG. 6A to FIG. 6C are diagrams illustrating exemplary images to be displayed by the image processing apparatus of a second embodiment.

As a result, an image acquired from the camera 91 is displayed on the display device 93 without undergoing image processing. In other words, a wide-angle image is displayed on the display device 93. FIG. 6A shows a concrete example of the wide-angle image whose angle of view is, for example, 180°. The image is initially displayed.

Figure 5B:
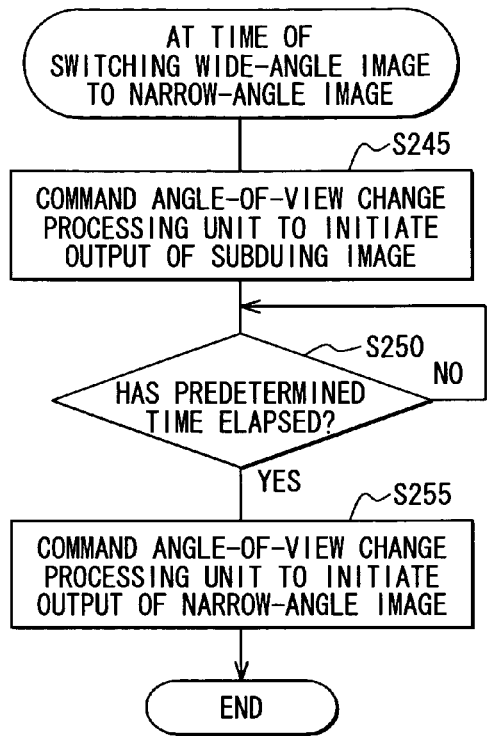

Next, an operation to be performed by the image processing apparatus 41 at the time of switching an image displayed on the display device 93, from a wide-angle image whose angle of view is, for example, 180° to a narrow-angle image whose angle of view is, for example, 130° will be described in connection with the flowchart of FIG. 5B. In the state of backing the vehicle, if the control unit 47 receives a signal from the obstacle sensing device 92 through the information input interface 45 signifying that a distance to an obstacle falls below 5 m, the control unit 47 issues a command to the angle-of-view change processing unit 43 signifying that an output image should be changed to an intermediate angle-of-view image whose angle of view is, for example, 155° at S245. Changing the angle-of-view in the above described manner is intended to subdue a large change in an angle of view, that is, a change in an angle of view from 180° to 130°. The angle-of-view change processing unit 43 having received the command initiates digital image processing, which brings about an angle of view of 155°, for the input image or raw image. It should be noted that the digital processing is such that a specific area is cut out of the input image or raw image and digital zooming is performed on the cut area.

A standby state is then established for a predetermined time at S250. A predetermined time is a time that is long enough for a user to recognize that an image has been displayed whose angle of view is different from that of an immediately preceding image. For example, in the present example, a relatively short time of one or three seconds would be appropriate. If a decision is made that the predetermined time has elapsed, the control unit 47 issues a command signifying that an output image should be changed from an intermediate angle-of-view image to an image whose angle of view is, for example, 130°, at S255. The angle-of-view change processing unit 43 having received the command initiates digital image processing, which brings about an angle of view of 130°, for the input image or raw image. It should be noted that the digital processing is such that a specified area is cut out of the input image or raw image and digital zooming is performed on the cut area.

Figure 6B:
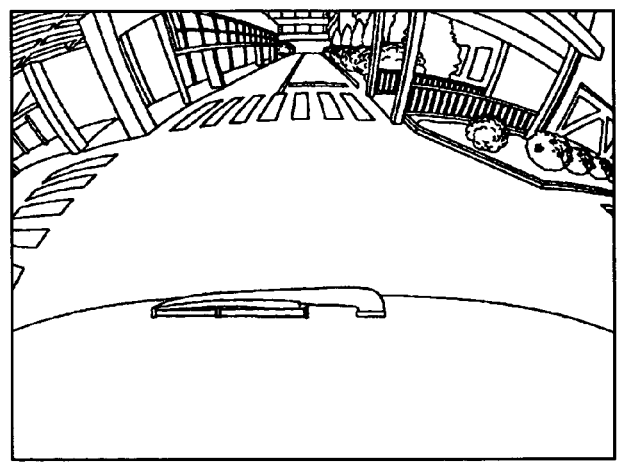
Figure 6C:
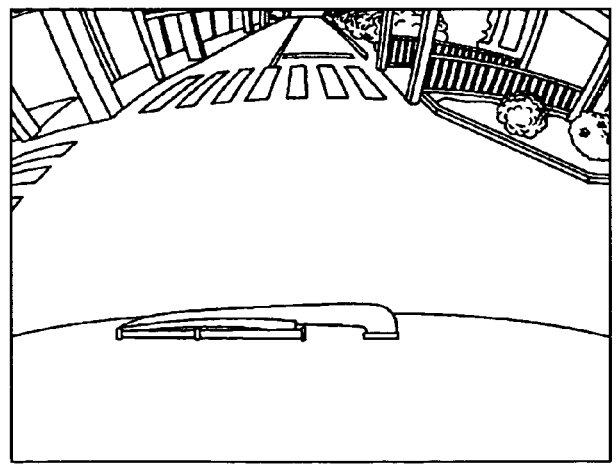

Herein, FIG. 6B and FIG. 6C show a concrete example of an image whose angle of view is 155° and a concrete example of an image whose angle of view is 130°. The image shown in FIG. 6B has an angle of view is 155°. Compared with the image shown in FIG. 6A, whose angle of view is 180°, the angle of view of the image shown in FIG. 6B is discernibly narrower. Moreover, the image shown in FIG. 6C is the image whose angle of view is 130°. Compared with the image shown in FIG. 6B, whose angle of view is 155°, the angle of view of the image shown in FIG. 6C is discernibly narrower.

As mentioned above, when the wide-angle image display state relevant to the angle of view of 180° is switched to the narrow-angle image display state relevant to the angle of view of 130°, if the angles of view are changed stepwise in order to switch the images, that is, to switch images from the image shown in FIG. 6A through the image shown in FIG. 6B to the image shown in FIG. 6C, a user can readily recognize the switching of the angles of view. Moreover, the user can readily recognize to what place in the post-switching image the pre-switching image corresponds.

Figure 5C:
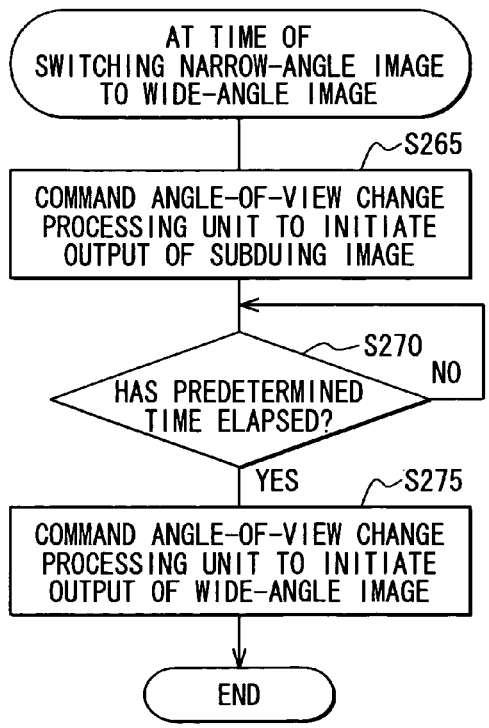

Next, an operation to be performed by the image processing apparatus 41 at the time of switching an image displayed on the display device 93, from a narrow-angle image whose angle of view is, for example, 130° to a wide-angle image whose angle of view is, for example, 180° will be described in connection with the flowchart of FIG. 5C.

In the state of backing the vehicle, if the control unit 47 receives a signal from the obstacle sensing device 92 through the information input interface 45 signifying that a distance to an obstacle is greater than or equal to 5 m or that no obstacle is sensed, the control unit 47 issues a command to the angle-of-view change processing unit 43 signifying that an output image should be changed to a intermediate-angle image whose angle of view is, for example, 155° at S265. Changing the angle-of-view in the above described manner is intended to subdue a large change in an angle of view, that is, a change in an angle of view from 130° to 180°. The angle-of-view change processing unit 43 having received the command initiates digital image processing, which brings about an angle of view of 155°, for the input image or raw image. It should be noted that the digital processing is such that a specific area is cut out of the input image or raw image and digital zooming is performed on the cut area.

The control unit 47 then stands by for a predetermined time at S270. A predetermined time is a time that is long enough for a user to recognize that an image whose angle of view is different from that of an immediately preceding image has been displayed. For example, a short time of one or three seconds would be appropriate. If a decision is made that the predetermined time has elapsed, the control unit 47 issues a command signifying that an output image should be changed to a wide-angle image whose angle of view is, for example, 180° at S275. The angle-of-view change processing unit 43, having received the command, initiates output of an image but does not perform digital image processing on the input image or raw image. As a result, the image whose angle of view is, for example, 180° is displayed on the display device 93.

As mentioned above, when the narrow-angle image display state relevant to the angle of view of 130° is switched to the wide-angle image display state relevant to the angle of view of 180°, the angles of view are changed stepwise in order to switch the images, that is, switch images from the image shown in FIG. 6C through the image shown in FIG. 6B to the image shown in FIG. 6A. Consequently, a user can readily recognize the switching of the angles of view. Moreover, the user can readily recognize to what place in the post-switching image the pre-switching image corresponds.

It should be noted that the image processing apparatus 41 of the second embodiment is designed so that an image is switched to an image of an intended angle of view via one step from an intermediate angle-of-view image such as an image whose angle of view is, for example, 155°. Alternatively, the image processing apparatus may be designed so that an image will be switched to an image of an intended angle of view via multiple steps from intermediate angle-of-view images, for example, to images whose angles of view are different from one another in units of 10° or the like.

Exemplary correspondences between the terms employed in the above description of a second embodiment and the terms set forth in claims are as follows. The image input interface 42 can act as the image input means, the control unit 47 can act as the angle-of-view switching means, the angle-of-view change processing unit 43 can act as an intermediate angle-of-view image production means, the image output interface 44 can act as the image output means, and the information input interface 45 can act as the shift position signal input means.

Third Embodiment

Figure 7:
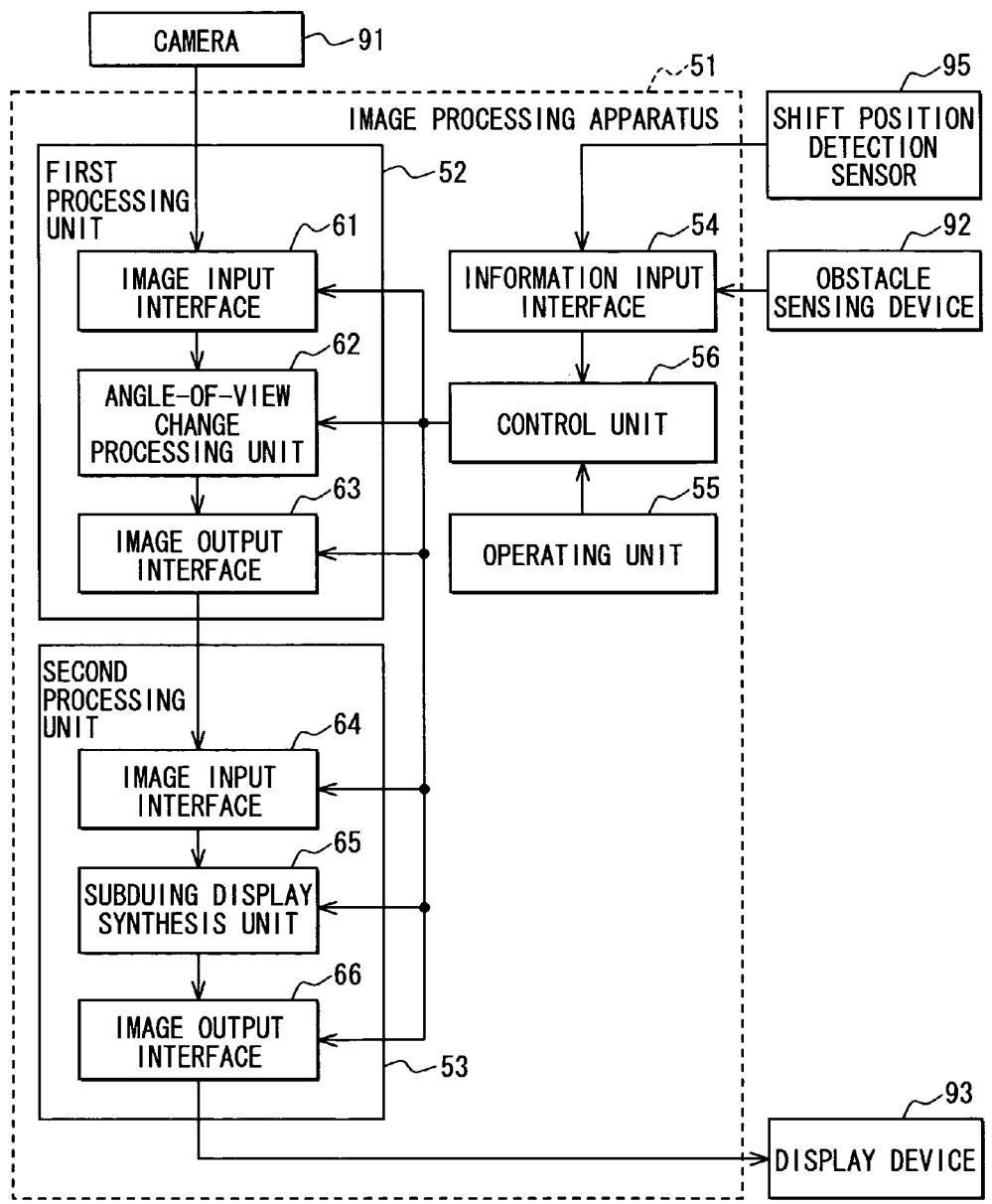
FIG. 7 is a block diagram illustrating a configuration of an exemplary image processing apparatus in accordance with a third embodiment.

Next, the third embodiment will be described with reference to FIG. 7, a block diagram illustrating an image processing apparatus 51 of a third embodiment and various devices connected thereto including, for example, a camera 91, an obstacle sensing device 92, and a display device 93 are connected to the image processing apparatus 51. The camera 91, obstacle sensing device 92, and display device 93 are identical to those of the first embodiment. An iterative description will be omitted.

The image processing apparatus 51 is a processing apparatus inputting an image of one kind of angle of view or a raw image from the camera 91, switching the raw image and an image of a narrow angle of view produced from the raw image, and outputting the images to the display device 93. The image processing apparatus 51 includes a first image processing section 52, a second image processing section 53, an information input interface 54, an operating unit 55, and a control unit 56.

The first image processing section 52 can change an angle of view of an inputted image from one to another or providing a zooming operation associated with the inputted image, and includes an image input interface 61, an angle-of-view change processing block 62, and an image output interface 63.

The image input interface 61 is an interface through which a video signal is inputted from the camera 91.

The angle-of-view change processing block 62 changes a video signal passed from the image input interface 61, to an image of a narrow angle of view, that is, an angle of view of 130° narrower than the angle of view of a raw image in response to a command sent from the control unit 56. Changing an angle of view is achieved according to a known digital image processing technology such as a technology for cutting out an image or providing a digital zooming operation associated with the image, whereby a narrow-angle image is produced. It should be noted that the angle-of-view change processing block 62 can output a video signal of an image whose angle of view is not changed to another, that is, a raw image that is a wide-angle image without any change.

A video signal of an image produced by the angle-of-view change processing block 62 is outputted to the second image processing section 53 through the image output interface 63.

The second image processing section 53 can overlay a range display on an image or region thereof inputted from the first image processing section 52, and includes an image input interface 64, a display subduing synthesis block 65, and an image output interface 66.

The image input interface 64 is an interface through which a video signal is inputted from the first image processing section 52.

The display subduing synthesis block 65 overlays display subduing on an image produced based on a video signal passed from the image input interface 64, in response to an instruction sent from the control unit 56. Display subduing is intended to subdue a user-recognizable change in an angle of view, or more particularly, is masking processing that makes it difficult to perceive a change in an angle of view. A concrete example will be presented later. It should be noted that if a display subduing overlay instruction is not issued from the control unit 56, the display subduing synthesis block 65 may output the video signal passed from the image input interface 64, to the image output interface 66 without change.

An image produced by the display subduing synthesis block 65 is outputted to the display device 93 through the image output interface 66. Various signals are inputted from the obstacle sensing device 92 through the information input interface 54.

The operating unit 55 includes a touch panel layered on or integrated into the display surface of the display device 93, mechanical switches arranged around the display device 93, and a steering switch disposed on a steering wheel. The operating unit 55 permits a user to input an operating command to the image processing apparatus 51.

The control unit 56 is formed with a known microcomputer, and executes various processing by controlling the aforesaid components according to programs stored in a ROM or a flash memory.

Next, an operation to be performed by the image processing apparatus 51 at the time of initiating display of an image will be described in connection with the flowchart of FIG. 8A will be described. In a state of backing a vehicle or a state in which the control unit 56 has received a signal from the shift position detection sensor 95 through the information input interface 54 signifying that the current shift position is the R position, if the control unit 56 receives an image display instruction from a user via the operating unit 55, the control unit 56 issues commands to the components of the first image processing section 53 at S305. Specifically, the control unit 56 issues a command signifying that acquisition of a video signal from the camera 91 should be initiated is issued to the image input interface 61; a command signifying that output of a raw image that is a wide-angle image should be initiated without any change in an angle of view is issued to the angle-of-view change processing block 62; and a command signifying that output of the video signal to the second image processing section 53 should be initiated is issued to the image output interface 63.

Thereafter, the control unit 56 issues commands to the components of the second image processing section 53 at S310. Specifically, the control unit 56 issues a command signifying that acquisition of a video signal from the first image processing section 52 should be initiated is issued to the image input interface 64; a command signifying that output of an input image should be initiated without synthesis of display subduing is issued to the display subduing synthesis block 65; and a command signifying that output of the video signal to the display device 93 should be initiated is issued to the image output interface 66.

Figure 10A:
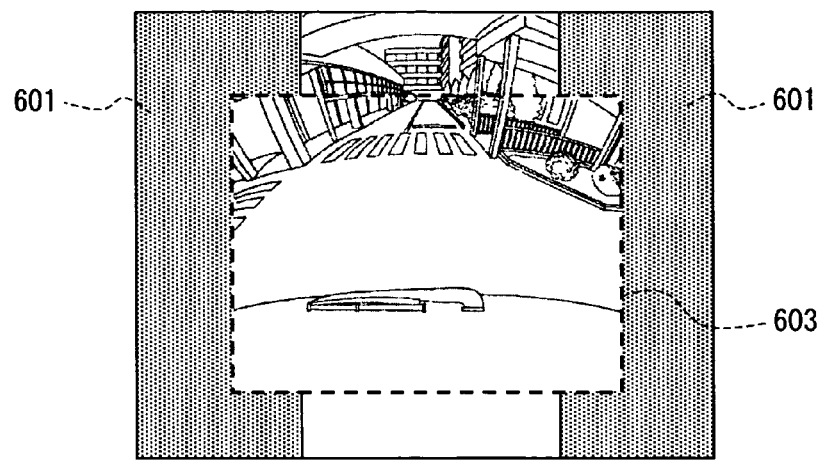
FIG. 10A to FIG. 10C are diagrams illustrating exemplary images to be displayed by the image processing apparatus of a third embodiment.

As a result, an image acquired from the camera 91 is displayed on the display device 93 without undergoing any image processing. Namely, a wide-angle image is displayed on the display device 93. FIG. 10C shows a concrete example of the wide-angle image whose angle of view is 180°. The image is initially displayed.

Next, an operation to be performed by the image processing apparatus 51 at the time of switching an image displayed on the display device 93, from a wide-angle image whose angle of view is, for example, 180° to a narrow-angle image whose angle of view is, for example, 130° will be described in connection with the flowchart of FIG. 8B. In the state of backing the vehicle, if the control unit 56 receives a signal through the information input interface 54 signifying that a distance to an obstacle falls below 5 m, the control unit 56 issues a command to the display subduing synthesis block 65 of the second image processing section 53 signifying that display subduing should be synthesized at S335. The display subduing synthesis block 65, having received the command, synthesizes display subduing to an input image. Referring to FIG. 9A to FIG. 10C, a concrete example of display subduing will be described below.

FIG. 10C shows an image obtained before display subduing is synthesized, that is, before the control unit 56 issues the foregoing command to the display subduing synthesis block 65, and whose angle of view is, for example, 180°.

Figure 10B:
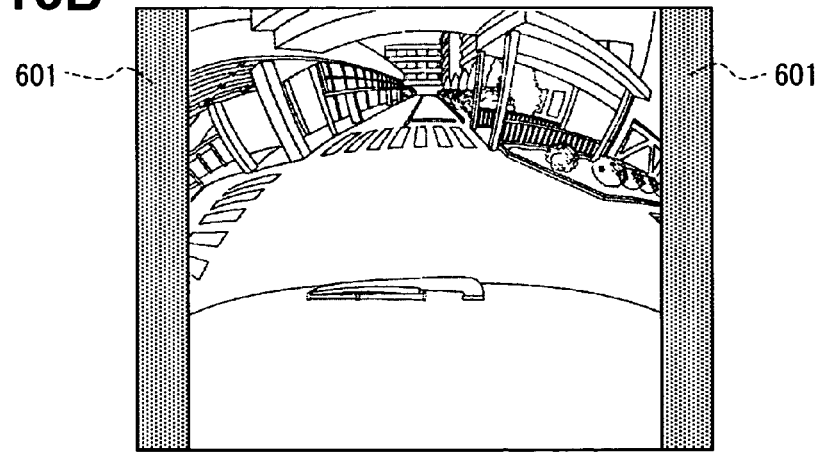
Figure 10C:
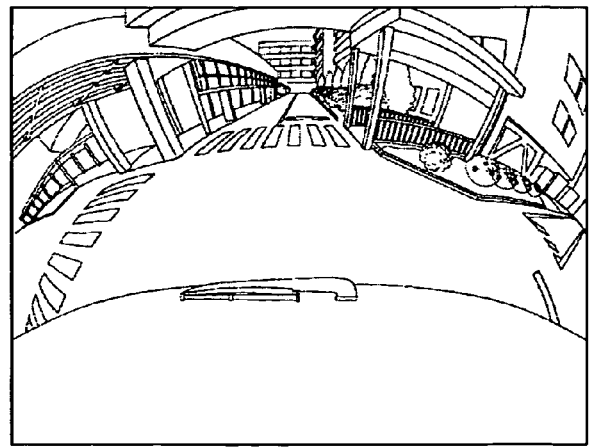

FIG. 10B shows an image displayed on the display device 93 in one second after the control unit 56 issues the aforesaid command to the display subduing synthesis block 65. As shown in FIG. 10B, the right and left edges of the image shown in FIG. 10C are masked with a belt-like mask 601. The mask 601 gradually expands from the right and left edges of the image to the center thereof, and is solidly painted out so that the masked part of the image will not be seen.

FIG. 10A shows an image displayed on the display device 93 two seconds after the control unit 56 issues the aforesaid command to the display subduing synthesis block 65. The mask 601 expands more greatly to the center of the image than that in the image shown in FIG. 10B. The part of the image delineated by a rectangular frame 603 in the center of the image is not masked. The rectangular frame 603 is a frame indicating a range of a narrow-angle image to which the image is switched.

Figure 9A:
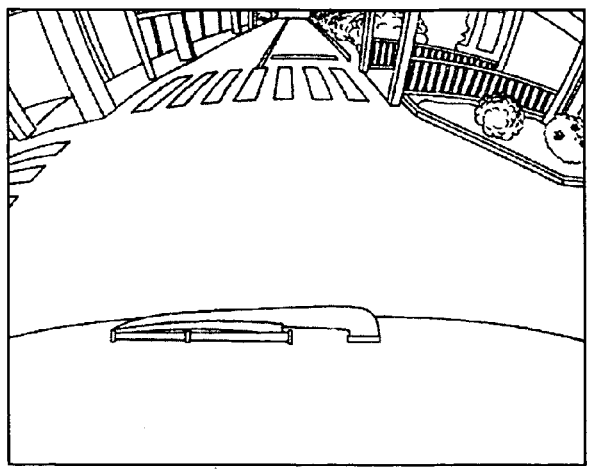
FIG. 9A to FIG. 9C are diagrams illustrating exemplary images to be displayed by the image processing apparatus of a third embodiment.
Figure 9B:
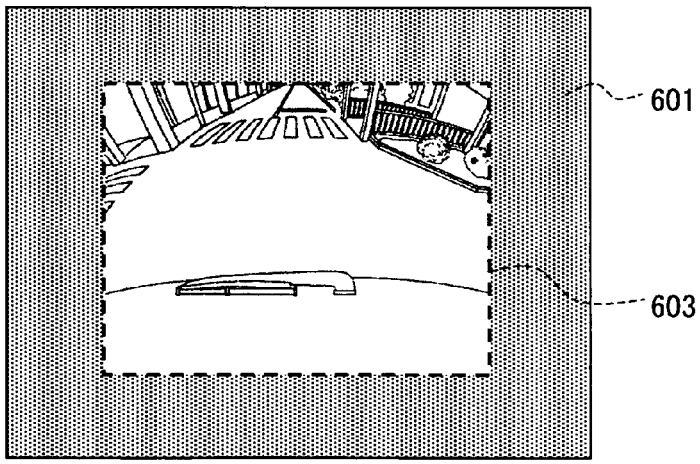
Figure 9C:
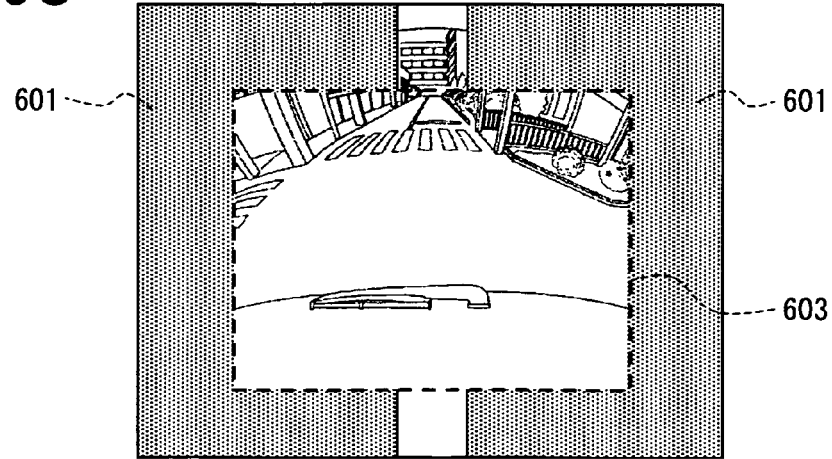

FIG. 9C shows an image displayed on the display device 93 three seconds after the control unit 56 issues the aforesaid command to the display subduing synthesis block 65. The mask 601 expands more greatly to the center of the image than that in the image shown in FIG. 10A. Similarly to the image shown in FIG. 10A, the part of the image delineated by the rectangular frame 603 in the center of the image is not masked.

FIG. 9B shows an image displayed on the display device 93 four seconds after the control unit 56 issues the aforesaid command to the display subduing synthesis block 65. The mask 601 expands more greatly to the center of the image than that in the image shown in. FIG. 9C, and is closed on the center line of the image. Similarly to FIG. 10A and FIG. 9C, the part of the image delineated by the rectangular frame 603 in the center of the image is not masked.

Referring back to FIG. 8B, additional description will be provided herein. The control unit 56 stands by for a predetermined time at S340 after the issuance of the command at S335. A predetermined time is a time that elapses until display subduing is terminated and can be, for examples, five seconds in a case where display subduing is performed to make progress with the images shown in FIG. 10B, FIG. 10A, FIG. 9C, and FIG. 9B displayed in that order. If a decision is made that the predetermined time has elapsed, the control unit 56 issues a command signifying that an output image should be changed to a narrow-angle image, to the angle-of-view change processing block 62 of the first image processing section 52 at S345. The angle-of-view change processing block 62, having received the command, initiates digital image processing for an input image or a raw image. The digital processing is such that an area covering an angle of view of 130° is cut out of the input image or raw image, and digital zooming is performed on the cut area. As a result, an image such as is shown, for example, in FIG. 9A, whose angle of view is, for example, 130°, is displayed on the display device 93.

As mentioned above, before an angle of view of an image displayed in the entire display area of the display device 93 is changed to another, display subduing or the mask 601 is synthesized to a wide-angle image. Because of the display subduing, the angle of view is gradually narrowed as shown in FIG. 10C, FIG. 10B, FIG. 10A, FIG. 9C, and FIG. 9B in that order. Namely, the angle of view is only pseudo-narrowed or apparently narrowed. Thereafter, the display subduing or mask is deleted. The narrow-angle image is displayed in the entire display area of the display device 93 nearly simultaneously with the deletion as shown, for example, in FIG. 9A. Consequently, since the display subduing is achieved, that is, since the mask 601 is displayed, a user can readily recognize that the wide-angle image is switched to the narrow-angle image. Moreover, because of the display subduing, the user can readily recognize to what place in the pre-switching image or wide-angle image the post-switching image or narrow-angle image corresponds.

Next, an operation to be performed by the image processing apparatus 11 at the time of switching an image displayed on the display device 93, from a narrow-angle image whose angle of view is, for example, 130° to a wide-angle image whose angle of view is, for example, 180° will be described in connection with the flowchart of FIG. 8C. In the state of backing the vehicle, if the control unit 56 receives a signal from the obstacle sensing device 92 through the information input interface 54 signifying that a distance to an obstacle is greater than or equal to 5 m or that no obstacle is sensed, the control unit 56 issues a command to the angle-of-view change processing block 62 signifying that an output image should be changed to a wide-angle image or raw image at S365. The angle-of-view change processing block 62, having received the command, ceases the digital image processing performed on the input image or raw image, and outputs the input image or raw image without any change.

The control unit 56 then issues a command to the display subduing synthesis block 65 of the second image processing section 53 signifying that display subduing should be synthesized at S370. The image to be displayed in response to the command is identical to the one that has undergone display subduing for example as described above at the time of switching a wide-angle image display state to a narrow-angle image display state. However, the reversal of display subduing is synthesized. Namely, images are changed in the sequence from the image shown in FIG. 9B through the images shown in FIG. 9C and FIG. 10A to the image shown in FIG. 10B. It should be noted that the timing of changing one angle of view to another at S365 is nearly synchronous with the timing of initiating display subduing at S370. Since the time difference is too short for a user to recognize, a user will not discern the wide-angle image shown in FIG. 10C at the timing of switching the image shown in FIG. 9A to the image shown in FIG. 9B. After the image shown in FIG. 10B is displayed, the mask 601 diminishes toward both the right and left edges of the image. Finally, an image devoid of a mask, such as the image shown in FIG. 10C, appears.

As mentioned above, when an angle of view of an image displayed in the entire display area of the display device 93 is switched to a wide-angle image, display subduing or the mask 601 is synthesized at the same time. Consequently, an angle of view discernible by a user gradually expands as shown in FIG. 9A, FIG. 9B, FIG. 9C, FIG. 10A, and FIG. 10B, for example, in that order. Finally, the wide-angle image is displayed in the entire display area of the display device 93 as shown, for example, in FIG. 10C. Consequently, since the display subduing is achieved or the mask 601 is displayed, the user can readily recognize that the narrow-angle image is switched to the wide-angle image. Moreover, because of the display subduing or rectangular frame 603, the user can readily recognize to what place in the post-switching image or wide-angle image the pre-switching image or narrow-angle image corresponds.

Exemplary correspondences between the terms employed in the above description of a third embodiment and the terms set forth in claims are as follows. The image input interface 64 can act as the image input means, the control unit 56 can act as the angle-of-view switching means, the image output interface 66 can act as the image output means, and the display subduing synthesis block 65 can act as the display subduing processing means, and the information input interface 54 can act as the shift position signal input means.

Other Embodiments

A first variant of a first embodiment involves the above described image processing apparatus 11, which has a section that can output an image produced by changing the angle of view of an inputted image from one to another, that is, the angle-of-view change processing block 22. If a camera is independently provided with an angle-of-view changing facility, the section of image processing apparatus 11 may be excluded from the image processing apparatus 11.

Figure 11:
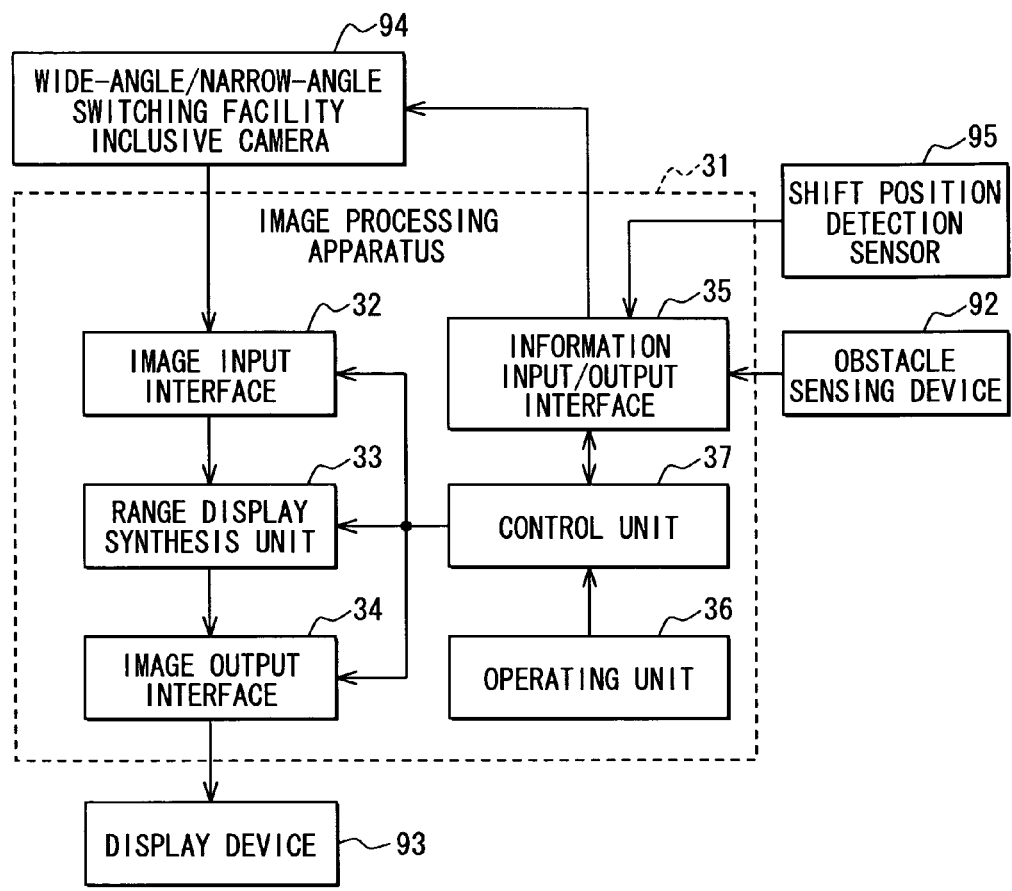
FIG. 11 is a block diagram illustrating a configuration of an exemplary image processing apparatus of another embodiment.

As a concrete configuration, the configuration of an image processing apparatus 31 as shown in FIG. 11 is conceivable. The image processing apparatus 31A includes a wide-angle/narrow-angle switching camera 94, an obstacle sensing device 92, a display device 93, and a shift position detection sensor 95. The wide-angle/narrow-angle switching camera 94 is a camera that can switch and output a wide-angle image, such as an image whose angle of view is 180°, and a narrow-angle image, such as an image whose angle of view is 130°. The switching can be in response to an external command by means of an optical mechanism. The obstacle sensing device 92, display device 93, and shift position detection sensor 95 are identical to those of the first embodiment. Moreover, the image processing apparatus 31 includes an image input interface 32, a range display synthesis unit 33, an image output interface 34, an information input/output interface 35, an operating unit 36, and a control unit 37.

The image input interface 32 is an interface through which a video signal is inputted from the wide-angle/narrow-angle switching camera 94. The range display synthesis unit 33 overlays a range display on an image produced based on a video signal passed from the image input interface 32, in response to an instruction sent from the control unit 37. When a range display overlay instruction is not issued from the control unit 37, the range display synthesis unit 33 may output the video signal passed from the image input interface 32, to the image output interface 34 without any change. The image output interface 34 is an interface through which a video signal of an image produced by the range display synthesis unit 33 is outputted to the display device 93.

The information input/output interface 35 is an interface through which various signals are inputted from the obstacle sensing device 92 and a shift position signal is inputted from the shift position detection sensor 95, and also is an interface through which an angle-of-view switching instruction signal is outputted to the wide-angle/narrow-angle switching camera 94.

The operating unit 36 includes a touch panel layered on or integrated into the display surface of the display device 93, mechanical switches arranged around the display device 93, and a steering switch disposed on a steering wheel, and that permits a user to input an operating command to the image processing apparatus 31.

The control unit 37 can be formed with a known microcomputer and executes various processing by controlling the foregoing components according to programs stored in a ROM or a flash memory.

It should be noted that the present variant differs from the image processing apparatus 11 of a first embodiment in that, although the control unit 16 issues an angle-of-view change command to the angle-of-view change processing block 22 in the image processing apparatus 11 of a first embodiment, the control unit 37 issues the angle-of-view change command to the wide-angle/narrow-angle switching camera 94 through the information input/output interface 35 in the image processing apparatus 31 in the present variant. An image displayed on the display device 93 is identical to the image displayed after being outputted from the image processing apparatus 11 of the first embodiment. The foregoing image processing apparatus 31 can thus provide the same advantage as the image processing apparatus 11 of the first embodiment.

In the present variant, the image input interface 32 can act as the image input means, the control unit 37 can act as the angle-of-vide switching means, the image output interface 34 can act as the image output means, the range display synthesis unit 33 can act as the range display processing means, and the information input/output interface 35 can act as the shift position signal input means.

In accordance with another variant of a first embodiment, at both of the time of switching a wide-angle image display state to a narrow-angle image display state and the time of switching the narrow-angle image display state to the wide-angle image display state, the aforesaid image processing apparatus 11 of the first embodiment synthesizes range display. Alternatively, only at one of the times of switching, range display may be synthesized.

The aforesaid image processing apparatus 51 of the third embodiment has a section which can output an image produced by changing the angle of view of an inputted image from one to another, that is, the angle-of-view change processing block 62. In accordance with another variant, if a camera itself has an angle-of-view change facility, the processing section may be excluded from the image processing apparatus 51.

Figure 12:
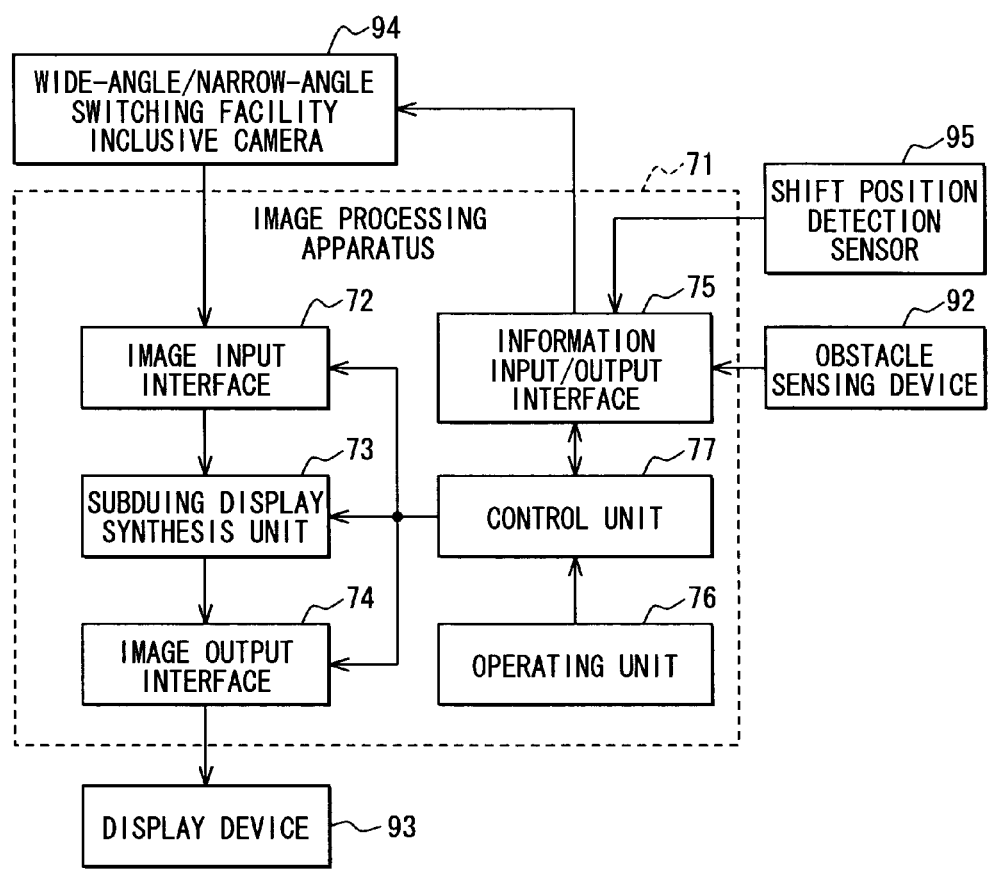
FIG. 12 is a block diagram illustrating a configuration of an exemplary image processing apparatus of another embodiment.

A concrete configuration of an image processing apparatus 71 shown in FIG. 12 is conceivable. A wide-angle/narrow-angle switching camera 94, an obstacle sensing device 92, a display device 93, and a shift position detection sensor 95 are connected to the image processing apparatus 71. It should be noted that the wide-angle/narrow-angle switching camera 94, obstacle sensing device 92, display device 93, and shift position detection sensor 95 are identical to those of the aforesaid embodiment. Moreover, the image processing apparatus 71 includes an image input interface 72, a display subduing synthesis unit 73, an image output interface 74, an information input/output interface 75, an operating unit 76, and a control unit 77.

The image input interface 72 is an interface through which a video signal is inputted from the wide-angle/narrow-angle switching camera 94. The display subduing synthesis unit 73 overlays display subduing on an image produced based on a video signal passed from the image input interface 72 in response to an instruction sent from the control unit 77. When a display subduing overlay instruction is not issued from the control unit 77, the display subduing synthesis unit 73 may output the video signal passed from the image input interface 72, to the image output interface 74 without change.

The image output interface 74 is an interface through which a video signal of an image produced by the display subduing synthesis unit 73 is outputted to the display device 93. The information input/output interface 75 is an interface through which various signals are inputted from the obstacle sensing device 92 and a shift position signal is inputted from the shift position detection sensor 95, and also is an interface through which an angle-of-view switching instruction signal is outputted to the wide-angle/narrow-angle switching camera 94.

The operating unit 76 includes a touch panel layered on or integrated into the display surface of the display device 93, mechanical switches arranged around the display device 93, and a steering switch disposed on a steering wheel. The operating unit 76 permits a user to input an operating command to the image processing apparatus 71.

The control unit 77 can be formed with a known microcomputer and executes various processing by controlling the foregoing components according to programs stored in a ROM or a flash memory.

The operation of present variant is different from the image processing apparatus 51 of the third embodiment in that, although the control unit 56 issues an angle-of-view change command to the angle-of-view change processing block 62 in the image processing apparatus 51 of the third embodiment, the control unit 77 issues the angle-of-view change command to the wide-angle/narrow-angle switching camera 94 through the information input/output interface 75 in the image processing apparatus 71 of the present variant. An image displayed on the display device 93 is identical to the image displayed after being outputted from the image processing apparatus 51 of the third embodiment. The image processing apparatus 71 of the present variant can provide the same advantage as the image processing apparatus 51 of a third embodiment.

In the present variant, the image input interface 72 can act as the image input means, the control unit 77 can act as the angle-of-view switching means, the image output interface 74 can act as the image output means, and the display subduing synthesis unit 73 can act as the display subduing processing means, and the information input/output interface 75 can act as the shift position signal input means.

In the aforesaid image processing apparatus 51 of the third embodiment, at both the time of switching a wide-angle image display state to a narrow-angle image display state and the time of switching the narrow-angle image display state to the wide-angle image display state, display subduing is synthesized. Alternatively, in another variant of the third embodiment, at only one of the times of switching, display subduing may be synthesized.

In the above described first embodiment and its variants, lines indicating the border of a narrow-angle image, that is, the narrow-angle image frame 503 is synthesized as range display to an image. In accordance with still another variant, instead of synthesizing the lines, an area that is contained in a wide-angle image but is not contained in the narrow-angle image may be painted out, displayed with different lightness, displayed with different saturation, displayed with different hue, or displayed discriminatingly in the form of a mosaic, or the like. When range display is carried out according to the foregoing technique, the same advantage as that in the aforesaid embodiments can be provided.

In the above described third embodiment and its variants, an area concerned is painted out as a mask so that the masked part of an image will be indiscernible. In accordance with still other variants, instead of painting out the area, the masked part of an image may be displayed with different lightness, the masked part of an image may be displayed with different saturation, the masked part of an image may be displayed with different hue, or the masked part of an image may be discriminatingly displayed in the form of a mosaic or the like.

When display subduing is achieved using the mask displayed according to the foregoing technique, the masked part of an image is harder to discern than the part of the image that is not masked and thus the same advantages can therefore be provided.

What is claimed is:

1. An image processing apparatus comprising:
an image input device configured to input an image associated with a video signal;
   an image output device configured to output the image inputted by the image input device to a display device using the video signal;
   an angle-of-view switching device configured to switch an angle of view of the image inputted by the image input device from a pre-switching angle of view to a post-switching angle of view in response to a single switching operation by a user; and
   an intermediate angle-of-view image production device configured to:
produce an intermediate image associated with an intermediate angle of view before the image inputted by the image input device is switched to the post-switching angle, the intermediate angle of view being between the pre-switching angle of view and the post-switching angle of view; and
      cause the image output device to output the intermediate image associated with the intermediate angle of view in a single switching sequence, caused by the single switching operation, from the pre-switching angle of view to the intermediate angle of view, to the post-switching angle of view,
   wherein the intermediate angle-of-view image production device is further configured to cause the image output device to continuously output the intermediate image for a set time between outputting a pre-switching image associated with the pre-switching angle of view and outputting a post-switching image associated with the post-switching angle of view.

2. The image processing apparatus according to claim 1, wherein the intermediate angle-of-view production device is further configured to:
   produce a plurality of intermediate images associated with a corresponding plurality of different intermediate angles of view before the image inputted by the image input device is switched from the pre-switching angle to the post-switching angle, the corresponding plurality of different intermediate angles of view between the pre-switching angle of view and the post-switching angle of view; and
   cause the image output device to output the plurality of intermediate images associated with the corresponding plurality of different intermediate angles of view in the single switching sequence from the pre-switching angle of view through the plurality of different intermediate angles of view, to the post-switching angle of view.

3. The image processing apparatus according to claim 1, wherein the image input means inputs an image captured by a camera configured to capture images associated with a range behind a vehicle.

4. The image processing apparatus according to claim 3, further comprising:
   a shift position signal input device configured to input a shift position signal of a vehicle,
   wherein when the signal inputted by the shift position signal input device signifies a backing shift position, the image output device outputs the image.

5. The image processing apparatus according to claim 1, wherein
   the intermediate angle-of-view image production device causes the image output device to continuously output the intermediate image for a predetermined time that is long enough to allow a user to recognize that the intermediate angle-of-view of the intermediate image is different from the pre-switching angle of view.

6. The image processing apparatus according to claim 5, wherein the pre-switching angle-of-view is wider than the post-switching angle of view.

7. The image processing apparatus according to claim 5, wherein the pre-switching angle-of-view is narrower than the post-switching angle of view.

8. The image processing apparatus according to claim 5, wherein the predetermined time is between 1 and 3 seconds.

9. The image processing apparatus according to claim 1, wherein the pre-switching angle-of-view is wider than the post-switching angle of view.

10. The image processing apparatus according to claim 1, wherein the pre-switching angle-of-view is narrower than the post-switching angle of view.

11. The image processing apparatus according to claim 1, wherein the set time is between 1 and 3 seconds.

12. The image processing apparatus according to claim 1, wherein
   the intermediate angle-of-view image production device is further configured to cause the image output device to output each of the plurality of different intermediate images for a set time between outputting a pre-switching image associated with the pre-switching angle of view and outputting a post-switching image associated with the post-switching angle of view.

13. The image processing apparatus according to claim 1, wherein each of the plurality of different intermediate images is about 10 degrees different in angle of view from each adjacent intermediate image.

14. An image processing apparatus comprising:
   an image input device configured to input an image associated with a video signal;
   an image output device configured to output the image inputted by the image input device to a display device using the video signal;
   an angle-of-view switching device configured to switch an angle of view of the image inputted by the image input device from a first angle of view to a second angle of view; and
   a display subduing processing device configured to perform display subduing on the image outputted by the image output device for a predetermined time to subdue a user-recognizable change in the angle of view when the angle of view of the image inputted by the image input device is switched from the first angle of view to the second angle of view by the angle-of-view switching device,
   wherein:

the first angle of view of the image includes a narrow angle of view and the second angle of view of the image includes a wide angle of view;

when the angle of view is switched from the first angle of view to the second angle of view, the display subduing includes:
　masking an area of the image associated with the second angle of view, the area not associated with the first angle of view, the masking performed simultaneously with the switching of the images; and unmasking the area by restoring a display state associated with before the masking is performed, the unmasking performed for the predetermined time;

the unmasking gradually reduces the area associated with the masking; and the unmasking gradually reduces the area from a center of the image to a right edge and a left edge thereof.

15. An image processing apparatus comprising:
an image input device configured to input an image associated with a video signal;
an image output device configured to output the image inputted by the image input device to a display device using the video signal;
an angle-of-view switching device configured to switch an angle of view of the image inputted by the image input device from a first angle of view to a second angle of view; and
a display subduing processing device configured to perform display subduing on the image outputted by the image output device for a predetermined time to subdue a user-recognizable change in the angle of view when the angle of view of the image inputted by the image input device is switched from the first angle of view to the second angle of view by the angle-of-view switching device, wherein:
the first angle of view includes a wide angle of view and the second angle of view includes a narrow angle of view; and when the angle of view is switched from the first angle of view to the second angle of view, the display subduing includes:
　masking an area of the image associated with the first angle of view not associated in the second angle of view, the masking performed for the predetermined time before the switching the angle of view;

unmasking by restoring a display state associated with before the masking is performed, the unmasking performed simultaneously with the switching of the images;

the masking gradually expands the area associated with the masking; and the masking gradually expands the area associated with the masking from a right edge and a left edge of the image to a center thereof.

16. The image processing apparatus according to claim 15, further comprising a shift position signal input device configured to input a shift position signal of a vehicle, wherein when the signal inputted by the shift position signal input device signifies a backing shift position, the image output device outputs the image.

\* \* \* \* \*